United States Patent [19]

Grönlund

[11] Patent Number: 5,896,436
[45] Date of Patent: Apr. 20, 1999

[54] FUEL ASSEMBLY FOR A BOILING WATER REACTOR

[75] Inventor: Magnus Grönlund, Västerås, Sweden

[73] Assignee: ABB Atom AB, Vasteras, Sweden

[21] Appl. No.: 08/981,629

[22] PCT Filed: Jun. 7, 1996

[86] PCT No.: PCT/SE96/00749

§ 371 Date: Mar. 12, 1998

§ 102(e) Date: Mar. 12, 1998

[87] PCT Pub. No.: WO97/00520

PCT Pub. Date: Jan. 3, 1997

[30] Foreign Application Priority Data

Jun. 14, 1995 [SE] Sweden ................... 9502148

[51] Int. Cl.⁶ ................... G21C 3/32
[52] U.S. Cl. ................... 376/446; 376/440
[58] Field of Search ................... 376/434, 435, 376/438, 440, 446

[56] References Cited

U.S. PATENT DOCUMENTS 4,560,532  12/1985  Barry et al. ................... 376/434
4,684,501  8/1987  Lui ................... 376/446
4,753,774  6/1988  Taleyarkhan et al. ................... 376/444
5,323,434  6/1994  Lorek et al. ................... 376/435

FOREIGN PATENT DOCUMENTS 446 135  8/1986  Sweden.

Primary Examiner—Daniel D. Wasil
Attorney, Agent, or Firm—Pollock, Vande Sande & Amernick

[57] ABSTRACT

The present invention relates to a fuel assembly in or for a boiling water reactor, comprising a plurality of vertical fuel rods extending between a top and a bottom tie plate and surrounded by a sleeve-formed casing where the fuel rods are positioned with the aid of a plurality of axially separated spacers. The invention is characterized in that only one fuel rod is detachably arranged in the top tie plate and in the bottom tie plate and in that at least one of the other fuel rods is fixed to the bottom tie plate and adapted to extend above the top tie plate to obtain a tensile-force-transmitting connection with the bottom tie plate.

11 Claims, 4 Drawing Sheets

FUEL ASSEMBLY FOR A BOILING WATER REACTOR

TECHNICAL FIELD

The present invention relates to a nuclear fuel assembly for a light-water nuclear reactor, and more particularly a boiling water reactor. The fuel assembly comprises a bundle of elongated elements which are retained and fixed by a plurality of spacers arranged in spaced relationship to each other along the bundle. The spacers comprise a plurality of cells for mutually fixing the elongated elements. A structure comprising elongated elements retained by spacers is referred to as a bundle. The ends of the bundle are retained at the bottom and at the top, respectively, by a bottom tie plate and a top tie plate, respectively. In certain boiling water reactor assemblies, the bundle is divided into four orthogonal sub-bundles and the lower and upper parts, respectively, of each sub-bundle, which are arranged in the fuel assembly, are retained by a bottom tie plate and a top tie plate, respectively. The bundle and the sub-bundles, are surrounded by a fuel channel. A coolant is adapted to flow from below and up through the normally vertically arranged fuel assembly and, during a nuclear reaction, to cool the fuel rods arranged in the assembly.

During, for example, inspection of the fuel or at a certain burnup stage, when the positions and/or orientations of the bundles or the sub-bundles are to be changed, the bundle or the sub-bundles is/are to be lifted out of the surrounding fuel channel. To achieve this lifting operation, a bottom tie plate or a lifting plate is normally arranged so that a member may engage this plate and then release the bundle or the sub-bundles from the fuel channel. In certain cases, a handle is provided for the fuel assembly for lifting and handling the entire fuel assembly. With the aid of this handle, an entire bundle can also be released from the fuel channel. In those cases where sub-bundles are to be inspected, for example, the handle is detached before the sub-bundles are released from the fuel channel.

BACKGROUND OF THE INVENTION

The design of the top tie plate or the top tie plates of the fuel assembly is very important for the performance of the fuel assembly. When coolant flows upwardly through the fuel assembly, it is important that the coolant be subjected to as low a pressure drop as possible. A low pressure drop in the fuel assembly is favorable for the stability properties of the fuel assembly. A low pressure drop also results in an increase of the capacity in the pumps which provide the fuel assembly with coolant, as well as an increase of the flexibility during operation of the reactor. Further, it is important that the top tie plate or the top tie plates be designed for lifting a bundle or four sub-bundles out of the fuel assembly.

FIG. 1 shows a prior art fuel assembly 1 for a boiling water reactor, and FIG. 3 shows in a view from above a prior art top tie plate 5a for a sub-bundle. Extra long fuel rods 3a, which partially extend above the top tie plate 5a, are adapted to run through two of the openings in the top tie plate 5a. The two extra long fuel rods 3a are fixed to the bottom tie plate 6 and are each provided, at the upper side of the top tie plate 5a, with a nut 8. The other rods 3 rest on the bottom tie plate 6 and make contact with the lower side of the top tie plate 5a by means of a helical spring 9 arranged around the respective end plugs 10 of the rods 3. The helical springs press the top tie plate 5a against the nuts 8, whereby the nuts 8 limit the maximum distance between the top and bottom tie plates 5a, 6. The two extra long fuel rods 3a are arranged in a tensile-force-transmitting connection between the top and bottom tie plates 5a, 6 while at the same time they limit the maximum distance between the top and bottom tie plates 5a, 6.

The top tie plate 5a is designed to receive a handling tool in a respective handling opening 11 located adjacent to the openings for the extra long rods 3a. The handling tool is passed through the top tie plate 5a by way of the handling openings 11, whereupon they are adapted to engage bars 5c at the respective handling opening 11 and thereafter to lift the sub-bundle out of the fuel assembly. The lifting movement means that a large part of the load is transferred from the bottom tie plate 6 to the supporting extra long rods 3a and to the top tie plate 5a via the nuts 8 which are threaded on the plugs 10 of the supporting extra long rods 3a above the top tie plate 5a and further to the handling tool. For the top tie plate 5a to manage this lifting movement, it must be designed from the strength point of view to manage the load of the whole sub-bundle. This means that the amount of material becomes large and hence that a certain pressure drops arises over the top tie plate 5a. Further, the strength of the top tie plate 5a imposes a limit to the load to which it may be subjected.

One problem with the embodiment described is that the supporting extra long fuel rods may have grown to different degrees upon irradiation during operation of the reactor, whereby the axial position of the nuts become different for the supporting rods, which means that the load may have an uneven distribution so that the whole load must be lifted in one rod. When lifting in this top tie plate, tools are required which can be guided through the handling opening and then engage the above-mentioned bars from the lower side of the top tie plate.

Differential rod growth may imply that it may be difficult to reach under the bars with the remote-controlled tool since the other fuel rods arranged with helical springs against the lower side of the top tie plate may have grown in the axial direction and approached the top tie plate and hence considerably reduced the space for the handling tool under the bars.

It is also known, in a fuel assembly comprising a bundle with a water tube arranged centrally therein, to arrange the water tube in a tensile-force-transmitting connection between the top and bottom tie plates and to lift out the bundle by lifting in the water tube. Thus, the water tube has two functions, namely, to fix the top tie plate and to transfer part of the load to the bottom tie plate.

The object of the invention is to provide a fuel assembly with a top tie plate which constitutes a low flow resistance, which does not impose any limit to the lifting force required to lift out a bundle or one or more sub-bundles. Further, the object of the invention is to achieve a fuel assembly in which the tensile-force-transmitting element or elements during handling of the bundle does/do not include the top tie plate.

SUMMARY OF THE INVENTION

The present invention relates to a fuel assembly having properties which provide a low pressure drop and freedom as regards the choice of top tie plate.

The fuel assembly comprises a top tie plate, the sole task of which is to retain the upper ends of a sub-bundle arranged in the fuel assembly. The top tie plate is fixed to a fuel rod, the other end of which is fixed to the bottom tie plate. The top tie plate is fixed to the fuel rod in such a way that the coolant flowing upwardly through the fuel assembly should not lift the top tie plate from its position around the fuel rod.

The remaining rods in the sub-bundle are arranged rest on the bottom tie plate and are adapted to run freely through the top tie plate. At least one, preferably two or more, of the other fuel rods mentioned are extra long and extend above the top tie plate to obtain a tensile-force-transmitting connection with the bottom tie plate of the sub-bundle when lifting in the end plug of the extra long rod. In addition, the extra long rod or rods is/are fixed to the bottom tie plate.

The advantage of the invention is that lifting occurs directly in a supporting fuel rod instead of via the top tie plate. Thus, the load is transferred directly from the bottom tie plate via the supporting fuel rod or rods to the handling tool. This means that it is possible to freely choose the top tie plate, the sole function of which is to retain the upper ends of the fuel rods. As top tie plate there may be chosen, for example, a conventional spacer with a low flow resistance which thus gives rise to a low pressure drop across the top tie plate. Alternatively, the number of bars in the known top tie plate may be reduced, as well as the amount of material therein, thus considerably reducing the pressure drop.

Differential rod growth in two or more supporting rods can be compensated for by balancing the lifting tool, so that the handling load is always distributed equally between the supporting rods independently of any differential rod growth.

An additional advantage of the invention is that the helical springs, arranged in the prior art below the top tie plate and around the fuel rods, may be eliminated.

Another advantage is that the function of the handling tool is not limited by any differential growth of the fuel rods.

DETAILED DESCRIPTION OF THE PREFERRED EMBODIMENTS

Figure 1:
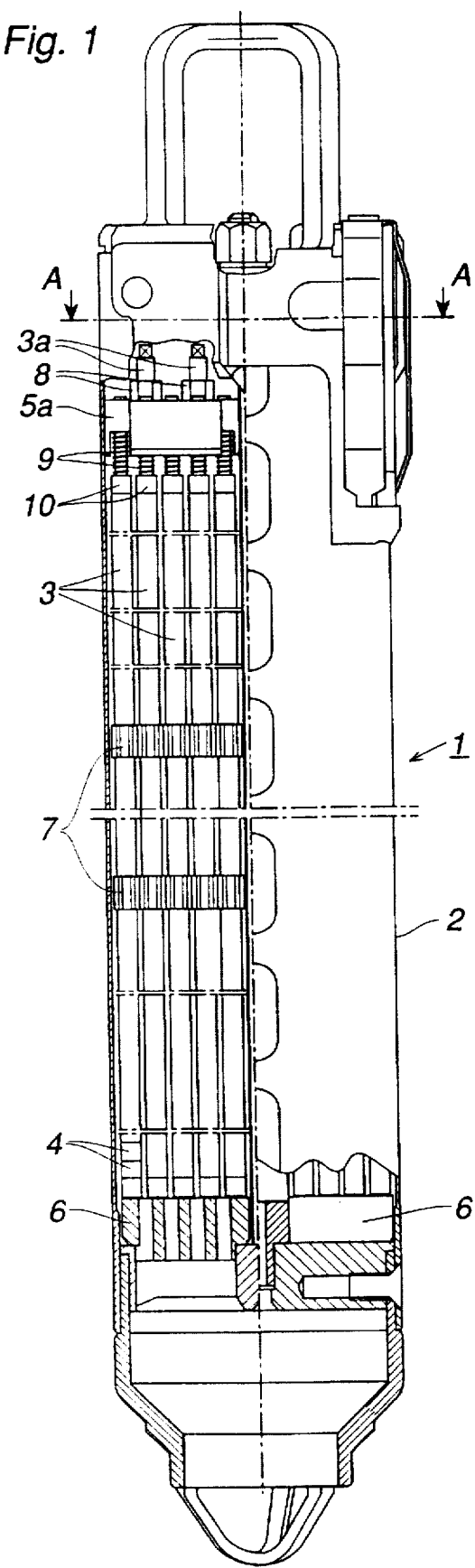
FIG. 1 shows a prior art fuel assembly for a boiling water reactor.

FIG. 1 shows a prior art boiling water reactor fuel assembly 1 which comprises a long tubular container, of rectangular cross section, referred to as fuel channel 2. The fuel channel 2 is open at both ends to form a continuous flow passage through which the coolant of the reactor flows. The fuel assembly 1 comprises a large number of equally long tubular fuel rods 3, arranged in parallel in a bundle, in which pellets 4 of a nuclear fuel are arranged. The fuel rods 3 are retained at the top by a top tie plate 5a and at the bottom by a bottom tie plate 6. The fuel rods 3 are kept spaced from each other by means of spacers 7 and are prevented from bending or vibrating when the reactor is in operation.

Through two of the openings in the top tie plate 5a, there are adapted to run extra long fuel rods 3a, which partly extend above the top tie plate 5a. The two extra long fuel rods 3a are fixed to the bottom tie plate 6 and are each provided with a nut 8 at the upper side of the top tie plate 5a. The other rods 3 rest on the bottom tie plate 6 and make contact with the lower side of the top tie plate 5a by means of a helical spring 9 arranged around the respective end plugs 10 of the rods 3. The helical springs 9 press the top tie plate 5a against these nuts 8, whereby the nuts 8 limit the maximum distance between the top and bottom tie plates 5a, 6. The two extra long fuel rods 3a are arranged in a tensile-force-transmitting connection between the top and bottom tie plates 5a, 6 while at the same time limiting the maximum distance between the top and bottom tie plates 5a, 6.

Figure 2:
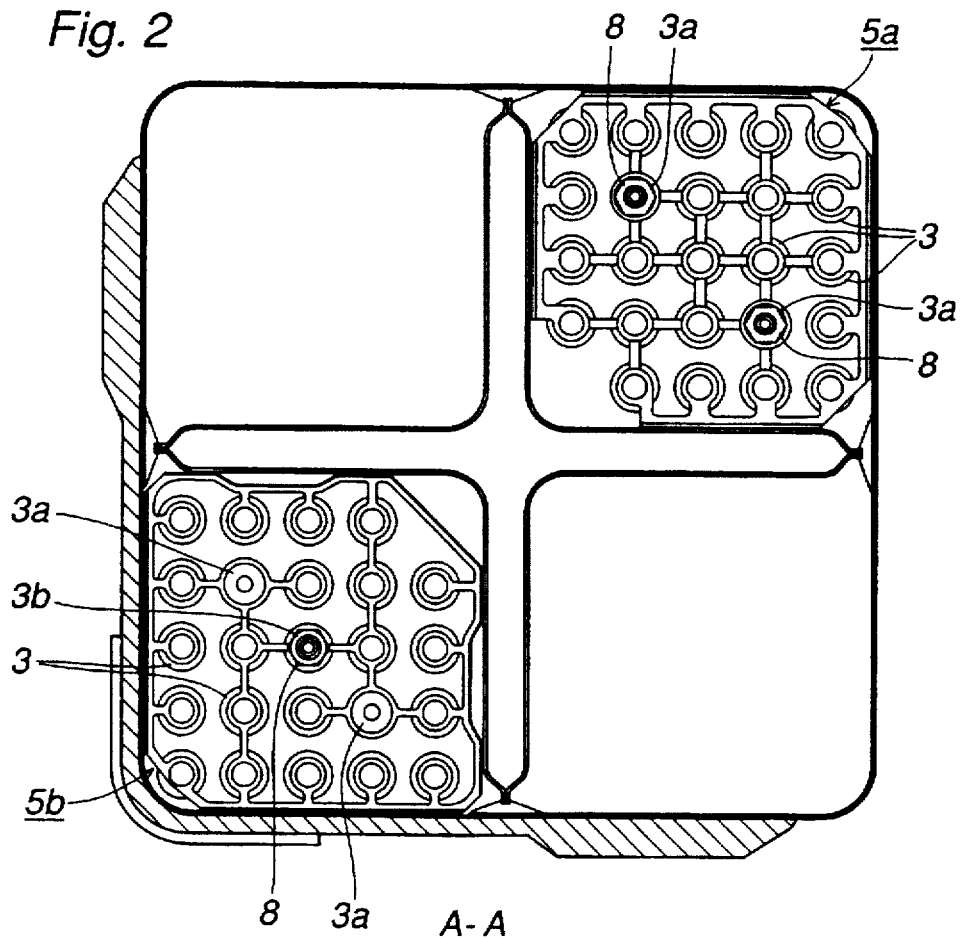
FIG. 2 shows, in a section A—A in FIG. 1, a prior art top tie plate for a boiling water reactor fuel assembly, and a top tie plate according to the invention.

FIG. 2 shows in a section A—A in FIG. 1, in the upper righthand corner, a prior art top tie plate 5a for a sub-assembly and, in the lower lefthand corner, a top tie plate 5b for a sub-assembly according to the invention. The prior art top tie plate 5a is described under the background art. The top tie plate 5b for a sub-assembly according to the invention is shown more clearly in FIGS. 4a and 4b.

Figure 3:
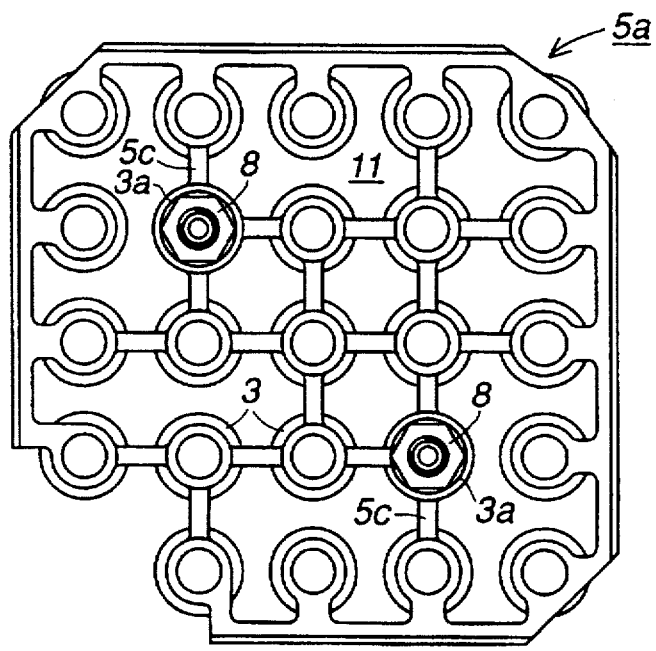
FIG. 3 shows, in a view from above, a prior art top tie plate for a sub-assembly for a boiling water reactor fuel assembly.
Figure 4A:
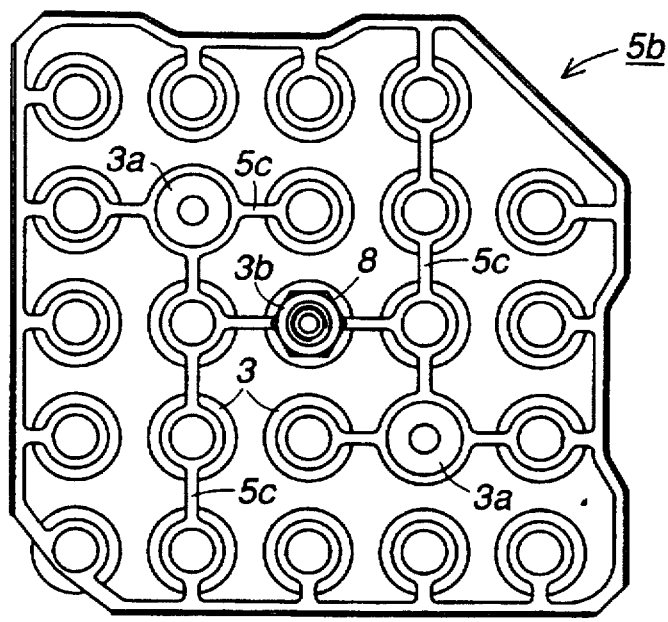
FIG. 4a shows, in a view from above, a top tie plate for a sub-assembly for a boiling water reactor fuel assembly according to the invention.

FIG. 4a shows the top tie plate 5b intended for a sub-assembly in a view from above. Only one of the fuel rods, designated 3b, is provided with a nut 8 at the upper side of the top tie plate 5b. The top tie plate 5b shown in FIG. 4a has a more open structure than that shown in FIG. 3 in that a plurality or bars 5c are removed whereby the thickness of the material has been reduced. In principle, the top tie plate 5b may be designed as a conventional spacer 7.

Figure 4B:
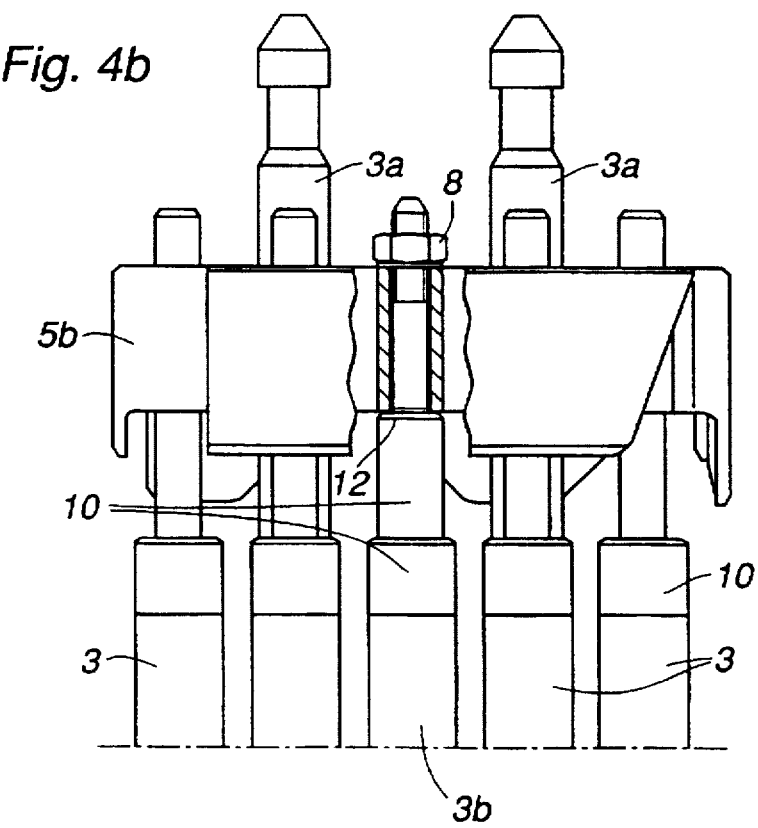
FIG. 4b shows, in a view from the side, a top tie plate for a sub-assembly for a boiling water reactor fuel assembly according to the invention and part of the upper part of the fuel rods and two extra long supporting fuel rods. The top tie plate is partially sectioned to show more clearly how the top tie plate is axially fixed to a fuel rod.

From FIG. 4b, in a view from the side of the top tie plate 5b, it is clear that only one of the fuel rods 3, that is, the fuel rod designated 3b, is arranged to fix the top tie plate 5b between a nut 8 and a collar 12 on the end plug 10. Two of the fuel rods 3a are extra long and adapted to extend above the top tie plate 5b. These two extra long fuel rods 3a are arranged fixed to the bottom tie plate 6 to obtain a tensile-force-transmitting connection therewith. The fuel rods which are fixed to the top tie plate 5b and/or the bottom tie plate 6 are detachably arranged therein. The other rods 3 in the bundle rest on the bottom tie plate 6 and are adapted to freely run through the top tie plate 5b.

Figure 4C:
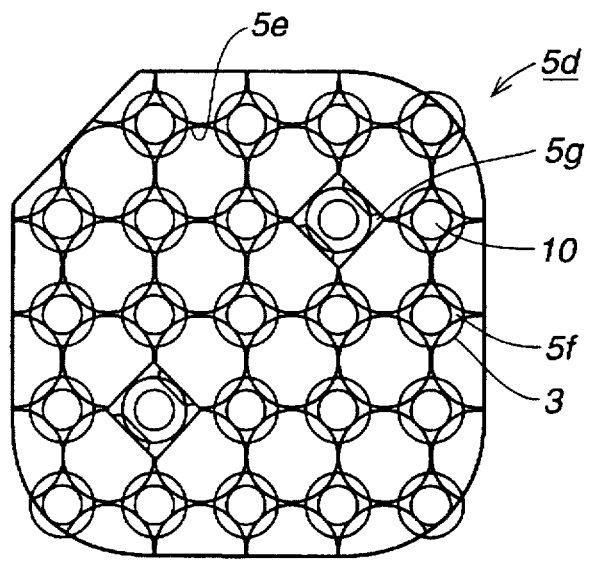
FIG. 4c, shows in a view from above, an alternative embodiment of a top tie plate for a sub-assembly for a boiling water reactor.

FIG. 4c shows an alternative embodiment of a top tie plate 5d intended for a sub-assembly. The top tie plate 5d comprises a plurality of tubular cells 5e. The cells 5e have a diameter which substantially corresponds to the distance between the center lines of the fuel rods 3 retained by the top tie plate 5d. The cells 5e are joined to each other in an orthogonal lattice. The end plugs 10 of the fuel rods 3 are arranged in the spaces 5f formed between the cells 5e in the top tie plate 5d. The cells 5e surrounding the extra long fuel rods 3a are designed such that a substantially square cross-section is imparted to the space 5g, suitable for receiving and supporting these cells.

Figure 5:
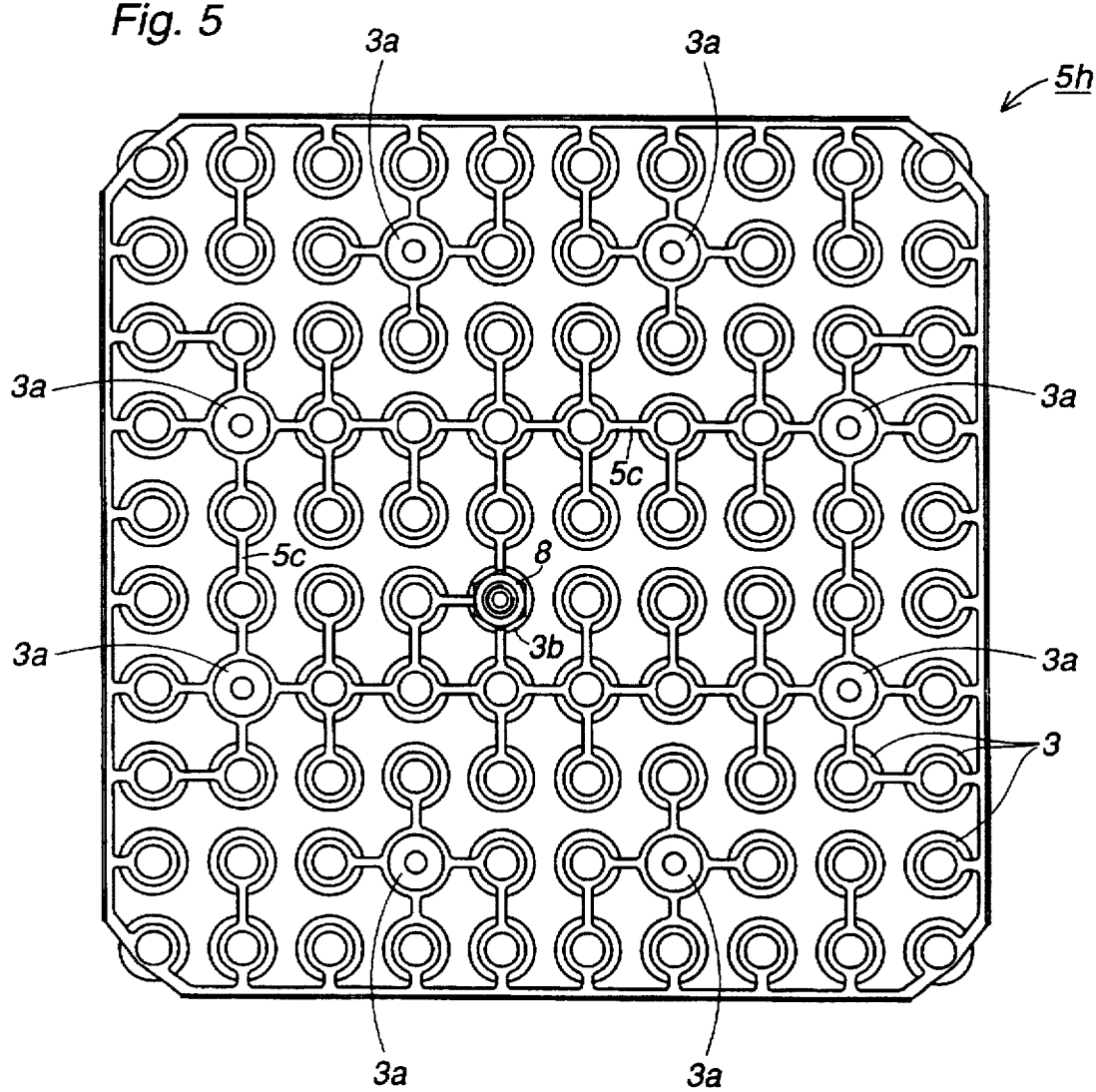
FIG. 5 shows, in a view from above, a top tie plate for a fuel assembly for a boiling water reactor according to the invention.

FIG. 5 shows, in a view from above, an alternative embodiment of a top tie plate 5h for a fuel assembly comprising a bundle of fuel rods 3. One of the fuel rods, designated 3b, is provided with a nut 8 at the upper side of the top tie plate 5h. Eight of the fuel rods are extra long fuel rods 3a and are arranged fixed to the bottom tie plate 6 to obtain a tensile-force-transmitting connection therewith.

I claim:

1. A fuel assembly in or for a boiling water reactor, said fuel assembly comprising a plurality of vertical fuel rods extending between a top and a bottom tie plate and surrounded by a sleeve-formed casing wherein the fuel rods are positioned with the aid of a plurality of axially separated spacers, and wherein only one fuel rod is detachably arranged in the top tie plate and in the bottom tie plate and at least one of the other fuel rods is fixed to the bottom tie plate and adapted to extend above the top tie plate to obtain a tensile-force-transmitting connection with the bottom tie plate.

2. A fuel assembly in or for a boiling water reactor, said fuel assembly comprising a plurality of vertical fuel rods distributed among four sub-bundles and surrounded by a sleeve-formed casing, each sub-bundle being positioned with the aid of a plurality of axially separated spacers, and each sub-bundle extending between a top and a bottom tie plate, only one fuel rod (3) in each sub-bundle being detachably arranged in the top tie plate and in the bottom tie plate and at least one of the other fuel rods in the sub-bundle being fixed to the bottom tie plate and adapted to extend above the top tie plate to make a tensile-force-transmitting connection with the bottom tie plate.

3. A fuel assembly according to claim 1, wherein the fuel rod which is detachably fixed to the top tie plate fixes the axial position of the top tie plate.

4. A fuel assembly according to claim 1, wherein said other fuel rods rest on the bottom tie plate and freely run through the top tie plate.

5. A fuel assembly according to claim 2 comprising one top tie plate for each sub-bundle.

6. A fuel assembly according to claim 2 comprising a top tie plate which is common to four sub-bundles.

7. A fuel assembly according to claim 1, wherein the top tie plate is made of stainless steel.

8. A fuel assembly according to claim 1, wherein the top tie plate is made of inconel.

9. A fuel assembly according to claim 1 wherein the top tie plate is designed as a spacer.

10. A fuel assembly according to claim 1, wherein the top tie plate comprises a plurality of tubular cells joined together in an orthogonal pattern and the spaces formed between the cells support the upper ends of the fuel rods.

11. A fuel assembly according to claim 1, comprising two supporting extra long fuel rods.

* * * * *

UNITED STATES PATENT AND TRADEMARK OFFICE
CERTIFICATE OF CORRECTION

PATENT NO. : 5,896,436
DATED : April 20, 1999
INVENTOR(S) : Grönlund

It is certified that error appears in the above-identified patent and that said Letters Patent is hereby corrected as shown below:

On the title page item [75], add the following inventor:

Häkan Söderberg, Västerås, Sweden

Signed and Sealed this

Twentieth Day of June, 2000

Attest:

Q. TODD DICKINSON

*Attesting Officer*    *Director of Patents and Trademarks*